US010572656B2

(12) United States Patent
Guenther (10) Patent No.: US 10,572,656 B2
(45) Date of Patent: *Feb. 25, 2020

(54) ISOLATED VIRTUAL ENVIRONMENTS FOR UNTRUSTED APPLICATIONS

(71) Applicant: Amazon Technologies, Inc., Reno, NV (US)

(72) Inventor: Andrew James Guenther, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/047,387

(22) Filed: Jul. 27, 2018

(65) Prior Publication Data

US 2018/0336346 A1    Nov. 22, 2018

Related U.S. Application Data

(63) Continuation of application No. 14/979,314, filed on Dec. 22, 2015, now Pat. No. 10,037,424.

(51) Int. Cl.
*H04L 29/06* (2006.01)
*G06F 21/53* (2013.01)
(Continued)

(52) U.S. Cl.
CPC .......... *G06F 21/53* (2013.01); *G06F 9/45558* (2013.01); *G06F 9/50* (2013.01);
(Continued)

(58) Field of Classification Search
None
See application file for complete search history.

(56) References Cited

U.S. PATENT DOCUMENTS 8,316,237 B1* 11/2012 Felsher ............ H04L 9/0825
380/282
8,572,735 B2* 10/2013 Ghosh ............. G06F 21/552
709/224

(Continued)

OTHER PUBLICATIONS

Kang, Kyuchang et al. Personalized Virtual Machine Based on User's Schedule Event. 2009 11th International Conference on Advanced Communication Technology. https://ieeexplore.ieee.org/stamp/stamp.jsp?tp=&arnumber=4809955 (Year: 2009).*

(Continued)

*Primary Examiner* — Jeremiah L Avery
(74) *Attorney, Agent, or Firm* — Hogan Lovells US LLP (57) ABSTRACT

A pool of virtual environments, such as virtual machine instances and containers, can be maintained by an intermediary service, where the virtual environments can execute a specified application or service. When a request is received from a client for a connection to a resource, the intermediary service can allocate one of the virtual environments for the client and enable the client and virtual environment to communicate as if the virtual environment is executing on dedicated hardware. The virtual environment can be virtually isolated on a host machine, whereby session data for the client is stored locally in memory and then deleted at the end of the session when the virtual environment is destroyed, in order to prevent the data from being accessible between sessions and preventing multiple clients or customers from sharing the same environment over time.

20 Claims, 6 Drawing Sheets

(51) Int. Cl.
*G06F 9/455* (2018.01)
*G06F 9/50* (2006.01)
(52) U.S. Cl.
CPC ............... *G06F 2009/4557* (2013.01); *G06F 2009/45583* (2013.01); *G06F 2009/45587* (2013.01); *G06F 2221/033* (2013.01)

(56) References Cited

U.S. PATENT DOCUMENTS

| | | | | |
|---|---|---|---|---|
| 8,639,492 | B2* | 1/2014 | Bogsanyl | G06F 9/45558 703/26 |
| 8,756,696 | B1 | 6/2014 | Miller | |
| 8,839,426 | B1* | 9/2014 | Brueckner | G06F 11/1469 726/22 |
| 8,856,790 | B1 | 10/2014 | Feathergill | |
| 8,904,298 | B2* | 12/2014 | Nelson | G06F 3/04815 463/32 |
| 9,720,716 | B2* | 8/2017 | Natu | G06F 9/45533 |
| 2006/0036570 | A1* | 2/2006 | Schaefer | G06F 9/44505 |
| 2007/0171921 | A1* | 7/2007 | Wookey | G06F 3/1415 370/401 |
| 2007/0234337 | A1* | 10/2007 | Suzuki | G06F 8/61 717/168 |
| 2008/0155169 | A1* | 6/2008 | Hiltgen | G06F 9/45558 711/6 |
| 2008/0201414 | A1* | 8/2008 | Amir Husain | G06F 9/445 709/203 |
| 2008/0222633 | A1* | 9/2008 | Kami | G06F 9/45558 718/1 |
| 2009/0328170 | A1* | 12/2009 | Williams | G06F 21/41 726/7 |
| 2010/0235831 | A1* | 9/2010 | Dittmer | G06F 9/45558 718/1 |
| 2010/0306528 | A1* | 12/2010 | Andress | H04L 63/0281 713/153 |
| 2015/0244617 | A1* | 8/2015 | Nakil | G06F 9/45558 709/224 |
| 2015/0309831 | A1* | 10/2015 | Powers | G06F 16/24565 718/1 |
| 2016/0044035 | A1 | 2/2016 | Huang | |
| 2017/0255482 | A9* | 9/2017 | Xu | G06F 9/45558 |

OTHER PUBLICATIONS

Kourai, Kenichi et al. Secure and Manageable Virtual Private Networks for End-users. 28th Annual IEEE International Conference on Local Computer Networks, 2003. LCN '03 Proceedings. https://ieeexplore.ieee.org/stamp/stamp.jsp?tp=&arnumber=1243164 (Year: 2003).*
Chang, Decheng et al. A Network-aware Virtual Machine Placement Algorithm in Mobile Cloud Computing Environment. 2013 IEEE Wireless Communications and Networking Conference Workshops (WCNCW). https://ieeexplore.ieee.org/stamp/stamp.jsp?tp=&arnumber=6533325 (Year: 2013).*
Non-Final Office Action issued in U.S. Appl. No. 14/979,314 dated Oct. 5, 2017.
Notice of Allowance issued in U.S. Appl. No. 14/979,314 dated Apr. 12, 2018.
Ayday, Erman; Delgosha, Farshid; Fekri, Faramarz. Location-Aware Security Services for Wireless Sensor Networks using Network Coding. 26th IEEE International Conference on Computer Communications, INFOCOM 2007. Pub. Date: 2007. http://ieeexplore.ieee.org/stamp/stamp.jsp?tp=&arnumber=4215728.
Guo, Wen; Simoni, Moemie; Yin, Chunyang. Automated Management of User Centric Session in NGN. 2008 IEEE GLOBECOM Workshops. Pub. Date: 2008. http://ieeexplore.ieee.org/stamp/stamp.jsp?tp&arnumber=4746600.

* cited by examiner

ISOLATED VIRTUAL ENVIRONMENTS FOR UNTRUSTED APPLICATIONS

CROSS-REFERENCE TO RELATED APPLICATION

This application is a continuation of allowed U.S. application Ser. No. 14/979,314, filed Dec. 22, 2015, entitled "ISOLATED VIRTUAL ENVIRONMENTS FOR UNTRUSTED APPLICATIONS," of which the full disclosure of this application is incorporated herein by reference for all purposes.

BACKGROUND

As an increasing number of applications and services are being made available over networks such as the Internet, an increasing number of content and service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed. A potential downside to such an approach, however, lies in the fact that these resources can be used by different customers over time. If a resource is used to run a service that handles customer data, but the service might be provided by a third party such that the resource provider does not have full control over the service, then there is a risk that customer data will not be protected between different customer sessions on that resource.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing the allocation of resources in an electronic environment. In particular, various embodiments utilize an intermediary service, or other such system or service, that is configured to manage a pool of virtual environments and allocate those virtual environments in response to client requests.

The pool of virtual environments can include environments such as virtual machine instances and containers, and can be configured to execute at least one specified application or service. When a request is received from a client for a connection to a resource, the intermediary service can allocate one of the virtual environments for the client and enable the client and virtual environment to communicate as if the virtual environment is executing on dedicated hardware. The client and virtual environment can also interact without knowledge of the intermediary service in at least some embodiments. A virtual environment can be configured to be virtually isolated on a host machine, whereby session data for the client is stored locally in memory and then deleted at the end of the session when the virtual environment is destroyed, in order to prevent the data from being accessible between sessions and preventing multiple clients or customers from sharing the same environment over time Various other applications, processes, and uses are presented below with respect to the various embodiments.

Figure 1A:
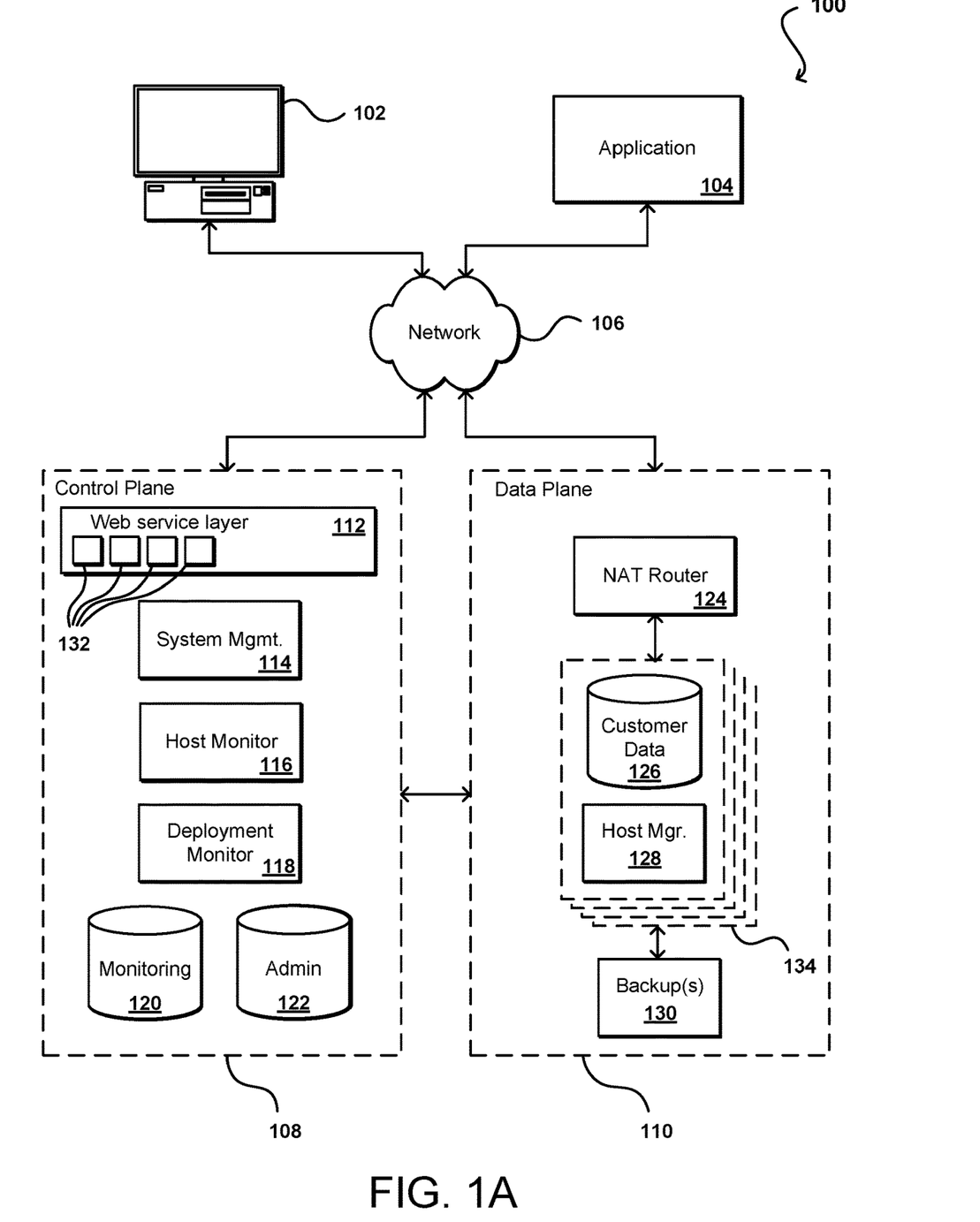
FIGS. 1A and 1B illustrate an example environment in which various embodiments can be implemented.

FIG. 1A illustrates an example operating environment associated with a service provider or other resource provider in accordance with various environments. As described, at least a portion of a customer operating environment can be migrated to the operating environment associated with a resource provider, such as resource provider environment 100 in FIG. 1A. The environment can be a multi-tenant environment, for example, wherein multiple customers are able to share the resources of the environment. This can include customers having dedicated resources, having dedicated portions of shared resources (i.e., shared storage on one or more data stores or data servers), or sharing available capacity on various resources, among other such options. Accordingly, the user can be provided access to resources appropriate to operate the user's enterprise computing needs. For example, a computing device 102 for an end user or customer can make calls through at least one network 106 (e.g., the Internet, a cellular network, a wireless network, a local area network (LAN), etc.) into a control plane 108 to perform a task such as to provision a data repository or launch a virtual environment in a data plane 110. The user or an application 104, for example, can access the repository and/or virtual environment directly through an interface of the data plane 110. While an end user computing device and application are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation, logically or geographically, of at least some resources (e.g., hardware and/or software) used to provide the respective functionality.

The control plane 108 in this example is essentially a virtual layer of hardware and software components that handles control and management actions, such as provisioning, instantiating, launching, scaling, replication, etc. The control plane in this embodiment includes a Web services layer 112, or tier, which can include at least one Web server, for example, along with computer-executable software, application servers, or other such components. The Web services layer also can include a set of APIs 132 (or other such interfaces) for receiving Web services calls or requests from across the at least one network 106. Each API can be provided to receive requests for at least one specific action to be performed with respect to the data environment. Upon receiving a request to one of the APIs, the Web services layer can parse or otherwise analyze the request to determine the steps or actions needed to act on or process the call. For example, a Web service call might be received that includes a request to launch a virtual environment. In this example, the Web services layer can parse the request to determine the type of virtual environment to be created, the type of hardware requested (if any), or other such aspects. Information for the request can be written to an administration ("Admin") data store, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the externally-facing customer APIs. The Web service layer can be responsible for Web service front end features such as authenticating customers based on credentials, authorizing the customer, throttling customer requests to the API servers, validating user input, and marshalling or unmarshalling requests and responses. The API layer also can be responsible for reading and writing configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures. Functions or configurations of the APIs or other such components can be managed by at least one system management component 114, or other such system or service.

As described, leveraging a service provider's environment can advantageously provide a customer with increased reliability and fault tolerance. For example, the control plane 108 in this embodiment includes at least one host monitoring component 116. The host monitoring component can comprise any appropriate combination of hardware and/or software including instructions for monitoring aspects of the data plane. For example, the host monitoring component can include a dedicated host machine, process distributed across a number of machines, or a Web service, among other such options. When a virtual machine ("VM") is created in the data plane, information for the VM can be written to a data store in the control plane, such as a monitoring data store 120. It should be understood that the monitoring data store can be a separate data store, or can be a portion of another data store such as a distinct set of tables in an Admin data store 122, or other appropriate repository. A host monitoring component 116 can access the information in the monitoring data store to determine active VMs, resource instances, or other such resources or components 134 in the data plane 110. A host monitoring component also can perform other tasks, such as collecting log and/or event information from multiple components of the control plane and/or data plane, such as the Web service layer and various host managers 128. Using such event information, the monitoring component can expose customer-visible events, for purposes such as implementing customer-facing APIs. A monitoring component can constantly monitor the health of all the running repositories and/or instances for the control plane, detect the failure of any of these instances, and initiate the appropriate recovery process(es).

Each resource instance 134 (e.g., data instance, virtual machine, container, or other virtual environment) in the data plane can include at least one data store 126 and a host manager component 128 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the instances for a new repository, including setting up logical volumes and file systems, installing database binaries and seeds, and starting or stopping the repository. A host manager can monitor the health of the data store, as well as monitoring the data store for error conditions such as I/O errors or data storage errors, and can restart the data store if necessary. A host manager can also perform and/or mange the installation of software patches and upgrades, as well as updates to configuration (e.g., specific virtual machine images) or firmware, etc. A host manger also can collect relevant metrics, such as may relate to CPU, memory, and I/O usage.

The host monitoring component 116 in the control plane 108 can communicate periodically with each host manager 128 for monitored instances 134, such as by sending a specific request or by monitoring heartbeats from the host managers, to determine a status of each host. In one embodiment, the monitoring component includes a set of event processors (or monitoring servers) configured to issue commands to each host manager, such as to get the status of a particular host and/or instance. In at least some embodiments, a deployment monitor component 118 can also communicate with hosts, instances, and other such components to attempt to determine when versions or configurations are deployed or updated, when communications are sent, and other such information. A deployment monitor can be part of, or separate from, the host monitor, as may both be provided as part of a monitoring service of the control plane.

Figure 1B:
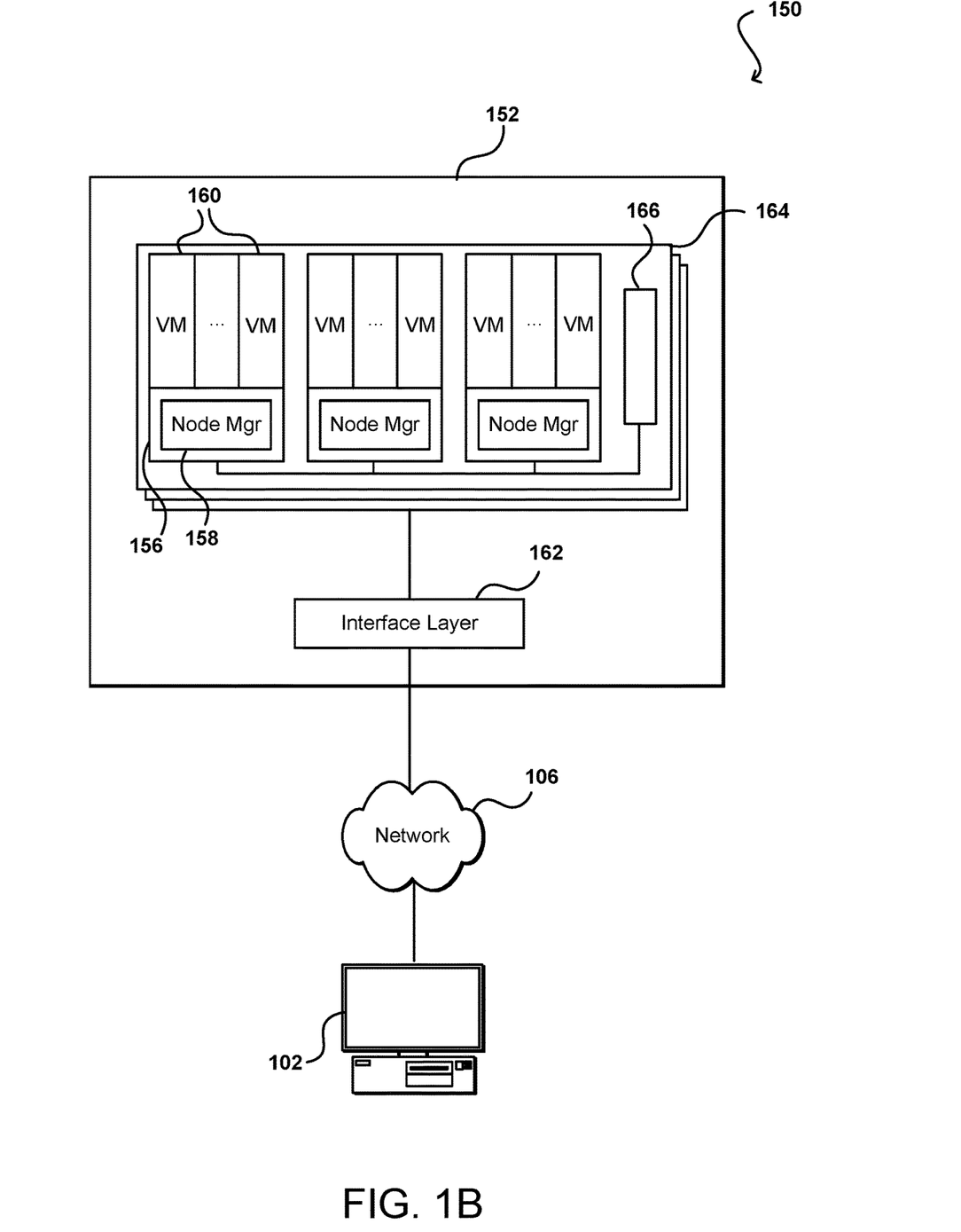

FIG. 1B illustrates a second view 150 of the example environment 100 in which aspects of the various embodiments can be implemented. In this example, a user is able to utilize the computing device 102 to submit a call or request to a shared resource environment 152. The resource environment 152 in this example includes an interface layer 162, as may include components such as application programming interfaces (APIs), routers, switches, Web servers, and other such components known or used for routing communications from a user computing device 102 to an appropriate resource in the environment. In this example, the resource environment 152 includes a number of racks 164, each rack including a number of host computing devices 156, as well as an optional rack support computing system 166 in this example embodiment. The host computing systems 156 on one of the illustrated racks 164 each host one or more virtual machines 160 in this example, as well as a distinct virtual machine manager 158 associated with the virtual machines on that host computing system. As mentioned, other virtual environments can be hosted as well within the scope of the various embodiments. The virtual machine manager (VMM) is tasked with managing the virtual machines (VMs) on the respective host device, and handling various aspects of virtualization. Each virtual machine 160 can act as an independent computing resource for executing one or more tasks on behalf of a user, where the virtual machine functions as a dedicated resource for the user. The environment can also include additional host computing systems that do not include distinct virtual machines, but may nonetheless each act as a computing resource for one or more users. The rack support computing system may provide various utility services for other computing systems local to its rack (e.g., long-term program storage, metering, and other monitoring of program execution and/or of non-local block data storage access performed by other computing systems local to the rack, etc.), as well as possibly to other computing systems located in the environment 152. Each computing system may also have one or more local attached storage devices (not shown), such as to store local copies of programs and/or data created by or otherwise used by the executing programs, as well as various other components.

It will be appreciated that the examples of FIGS. 1A and 1B have been simplified for the purposes of explanation, and that the number and organization of host computing systems and other devices may be much larger than what is depicted. For example, as one illustrative embodiment, there may be approximately tens of thousands of computing systems in a cloud environment, with at least some of those computing systems being host computing systems that may each host multiple virtual environments.

In such an environment, resources such as virtual environments can be utilized by various customers over time. As an example, an application such as an Internet browser application might have some rendering performed on a client device and some rendering performed in a resource provider environment, in order to leverage the much larger capacity and expanded capabilities of the resource provider environment, at least with respect to certain types of client devices with relatively limited capabilities. In at least some embodiments, each instance of the browser rendering engine might execute in a corresponding virtual environment executing on a server or host machine in the resource provider environment. A given rendering engine might be used sequentially by several different customers over several different sessions.

A potential problem arises when the application or service is provided by a third party over which the resource provider and/or customer does not have control. Since multiple instances can run on a single machine, those instances will share various resources. These shared resources will also be used over time for different customers. If the application or service is not a completely trusted application or service, such as one that is under full control of the resource provider, then this sharing of resources provides some level of risk that customer data for the various sessions may be unsecure, or able to be obtained by other customers or instances sharing at least some of the same resources.

Accordingly, approaches in accordance with various embodiments enable virtual environments to be provided for such applications, services, or functionality that enable those environments to operate on shared resources in a way that prevents customer data from being shared and causes those applications or services to function in a way that appears as if those applications and services are executing on dedicated and/or isolated resources. The approaches can be implemented so as to be transparent to the client devices and the applications or services.

Figure 2:
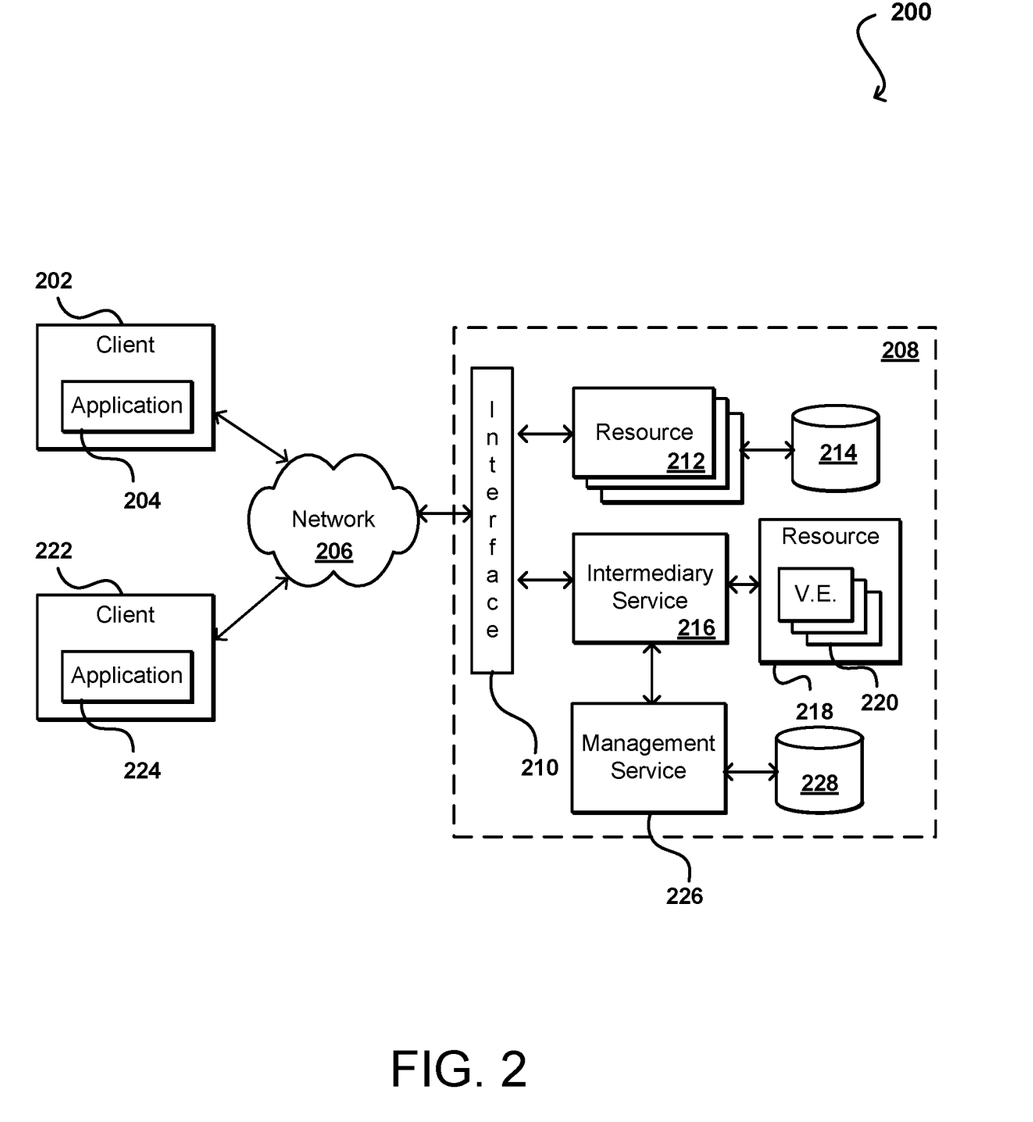
FIG. 2 illustrates an example environment in which an intermediary service can manage connections between clients and isolated resource environments that can be utilized in accordance with various environments.

FIG. 2 illustrates an example environment 200 that can be used to implement aspects of the various embodiments. As illustrated, different customers are able to use various client devices 202, 222 to submit requests across at least one network 206 to a resource provider environment 208 as discussed previously. The client devices can each include any appropriate electronic device operable to send and receive requests, messages, or other such information over an appropriate network and convey information back to a user of the device. Examples of such client devices include personal computers, tablet computers, smart phones, notebook computers, and the like. The at least one network 206 can include any appropriate network, including an intranet, the Internet, a cellular network, a local area network (LAN), or any other such network or combination, and communication over the network can be enabled via wired and/or wireless connections.

As mentioned, the provider environment may include various types of resources that can be utilized by multiple users for a variety of different purposes. In at least some embodiments, all or a portion of a given resource or set of resources might be allocated to a particular customer or allocated for a particular task, for at least a determined period of time. In this example the provider environment includes a plurality of resources 212 of one or more types. These types can include, for example, application servers operable to process instructions provided by a user or database servers operable to process data stored in one or more data stores 214 in response to a user request. In at least some embodiments, a user wanting to utilize a portion of the resources 212 can submit a request that is received to an interface layer 210 of the provider environment 208. The interface layer can include application programming interfaces (APIs) or other exposed interfaces enabling a user to submit requests to the provider environment. The interface layer 210 in this example can also include other components as well, such as at least one Web server, routing components, load balancers, and the like. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision or allocate the resources, or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

As mentioned, each client device 202, 222 can run a respective instance of an application 204, 224, such as a browser application, although various other applications, modules, and functionality can be utilized as well as discussed and suggested elsewhere herein. Each of these applications can request that at least a portion of the associated functionality, such as rendering in the case of a browser application, be performed in the resource provider environment by one or more appropriate resources. In a conventional approach, the request would cause a session to be generated using a virtual machine, or other such component, executing on a server or other such resource 212 in the environment, with customer data for the session being persisted to at least one persistent data store 214. As mentioned, however, the sharing of resources can raise a potential security concern when the application or service is provided by, or associated with, a third party provider.

Approaches in accordance with various embodiments can take advantage of an intermediary service 216, or other such system, service, component, or device, that can manage connections to resources in at least some of these and other such situations. In this example, the intermediary service 216 can manage a pool of virtual environments 220, such as virtual machines or Linux containers, for example, that reside on one or more resources 218, such as servers or host machines. Each of these virtual environments 220 can be pre-allocated environments that are virtually isolated from the other environments, and configured to execute instances of a particular service or application. The customer data for each virtual environment 220 can be contained within that virtual environment, such as by being stored to resident memory (e.g., RAM), and not written to persistent storage. When the session for a current customer is ended, that virtual environment 220 can be destroyed, including destruction of the local copy of all data that was stored by the virtual environment for the customer session. After the virtual environment is destroyed, a new virtual environment can be created in order to refill the pool of pre-allocated virtual environments.

In such an implementation, each of the virtual environments can be unaware of the external service and can function independently of the intermediary service. Similarly, the intermediary service can be "invisible" to both the client and the embedded service in the virtual environment, such that the client device and embedded service function as if connected directly (or at least without an intermediary service there between). As mentioned, in at least some embodiments a single customer can be allocated to a single instance of the embedded service and any customer data destroyed at the end of a session. Alternatively, if the embedded service in only single tenant, meaning that it can only handle one customer at a time, the intermediary service can manage multiple customers connecting concurrently to multiple instances of the desired single-tenant service. Although illustrated as a separate resource in the resource provider environment, the intermediary service could be operated on the same host(s) as the virtual environments or offered as an external third party service, among other such options.

Using the isolated virtual environments, the instances of the embedded service can still share resources but do so in a way that prevents the sharing of customer data and enables each instance of the embedded service to function as if it is executing on dedicated hardware and independent of any other virtual environments executing on specific hardware. These resources can include, for example, system-level resources such as RAM or processor (i.e., CPU) cycles, as well as resources such as copies of executables or directories for storing data beyond session termination, among other such options. This functionality acts like a very thin virtualization layer or container wrapped around the embedded service. Any appropriate virtualization technology can be used for such purposes, such as the open source Docker technology. Technologies such as Docker can enable distributed applications and services to run at scale using existing machine images of the resource provider environment. An interface such as a Docker application programming interface (API) can be used to generate the various virtual environments.

In a specific example, an application 204 executing on a client device can submit a request to the interface layer 210 of the resource provider environment to access the respective service. One or more components of the interface layer 210 can determine the type, source, and/or destination of the request, and can cause that request to be directed to an intermediary service 216 instead of a conventional resource. In some embodiments the intermediary service will instead listen for such requests and intercept the requests before they are directed to conventional resources. The intermediary service 216 can maintain a pool of virtual environments 220 in one or more resources 218, with each resource potentially having multiple local connections to the various virtual environments executing thereon. The number of virtual instances created on a host machine, for example, can depend at least in part upon factors such as the capacity of, and current load on, the host machine. When a request is received on behalf of a client device, the intermediary service can connect the client device to an allocated virtual environment in order to enable the client to access the embedded service. The intermediary service can monitor the session, and can destroy the virtual environment once the session is over. In at least some embodiments the data for the session is never written to a hard drive or other persistent storage. Each virtual environment can function as if it has dedicated storage, but that storage is actually local storage that is erased at the end of the session. Various safeguards, such as Linux safeguards or Docker security mechanisms, can be used to ensure that different processes do not have access to data for other processes in the same memory device. Any data to be persisted can be written to an external and/or secure storage system, or other appropriate location as discussed or suggested herein that enables the data to be securely stored and inaccessible to other virtual environments unless otherwise allowed.

The intermediary service 216 can also enable the client device and embedded service to function as if the intermediary service was not involved in the connection. In at least some embodiments, the intermediary service can also collect data for purposes such as analyzing various performance metrics (i.e., container resource utilization) for the virtual environments. In some embodiments, this can include sending at least some of the data to a management service 226, or other such system or component, that can aggregate, analyze, and/or otherwise process the data to generate performance data or other such metrics, which can be stored to an appropriate data store 228 or other such location as discussed elsewhere herein. The intermediary service can also communicate with various external services for purposes such as performance monitoring, pool management, and the like. In some embodiments the intermediary service can send pings to the client device and/or virtual environments for purposes of health monitoring. In the event an embedded service becomes unavailable, the intermediary service will still have a connection to the client device and can provide notifications and/or options to the client device instead of simply dropping the connection as with conventional approaches. In some embodiments, the intermediary service can transparently reconnect the client device to another (or new) instance of the service using a different virtual environment. In this way the client device can continue to operate without becoming aware that a failover occurred, although a rendering or other operation in process during the crash might have to be re-executed using the new virtual environment. As mentioned, various types of functionality can be offered by untrusted code executing in such an environment, as may include rendering, media transcoding, content transformation, and the like. Operating the embedded services or code in isolated environments prevents the need to attempt to determine what the code is doing and prevent any unintended or undesirable operations from affecting other code or data stored on a resource or set of resources, at least as relates to the untrusted code.

In some embodiments, the client device and/or virtual environment may be aware of the presence of the intermediary service. This can provide for additional functionality, such as where a client device might not have sufficient information for a request, or a customer might not want to maintain all the information for a request. In such an instance the client device can send an "incomplete" request, or preliminary request, that the intermediary service can use to generate and forward a complete request. The embedded service receiving the request might be able to process the request as if received from the customer without any knowledge of the presence of the client device. Similarly, an intermediary service might be able to store customer data that does not need to be transmitted to the embedded service, and the embedded service might send an incomplete response to the intermediary service that causes the intermediary service to fill in the appropriate customer data, among other such options.

Similarly, if the intermediary device has information about improper requests or requests that could advantageously be modified, the intermediary service can modify the request before passing it to the embedded service. For example, if a type of call or variable is not properly interpreted by the current version of the embedded service, the intermediary service can modify the request such that it appears to the embedded service as if the client submitted a request that can properly be processed, etc. Similarly, the intermediary service can swap out values for certain fields in a response that will be more appropriate for the client device or other intended recipient.

In some embodiments, different virtual environments might be available that have different properties. For example, a first version of a browser application might use a different set of fonts than a second version of the browser application. If the browser application cannot properly manage two sets of fonts, then different virtual environments can be maintained that each include the appropriate set of fonts for the appropriate version. When the intermediary service receives a request requiring one of the versions, the intermediary service can cause a connection to be established between the client device and an appropriate virtual environment. In some embodiments the intermediary service can generate a new virtual environment that includes the appropriate font and version, or can inject the correct information into a general environment, among other such options.

The ability to operate these services in such environments can potentially expose them to misuse by certain parties. In order to mitigate this risk, approaches in accordance with various embodiments can monitor the number and/or types of requests from these environments and perform throttling, blocking, or other mitigations at the intermediary service. This can be based on activity for an individual virtual environment or a set of environments, as may be allocated to a particular customer, serving a similar service, or used for a particular purpose. The visibility into the traffic enables the intermediary service to detect patterns of potential misuse and take appropriate actions, whether to generate some type of notification or take a remedial action, among other such options.

Figure 3:
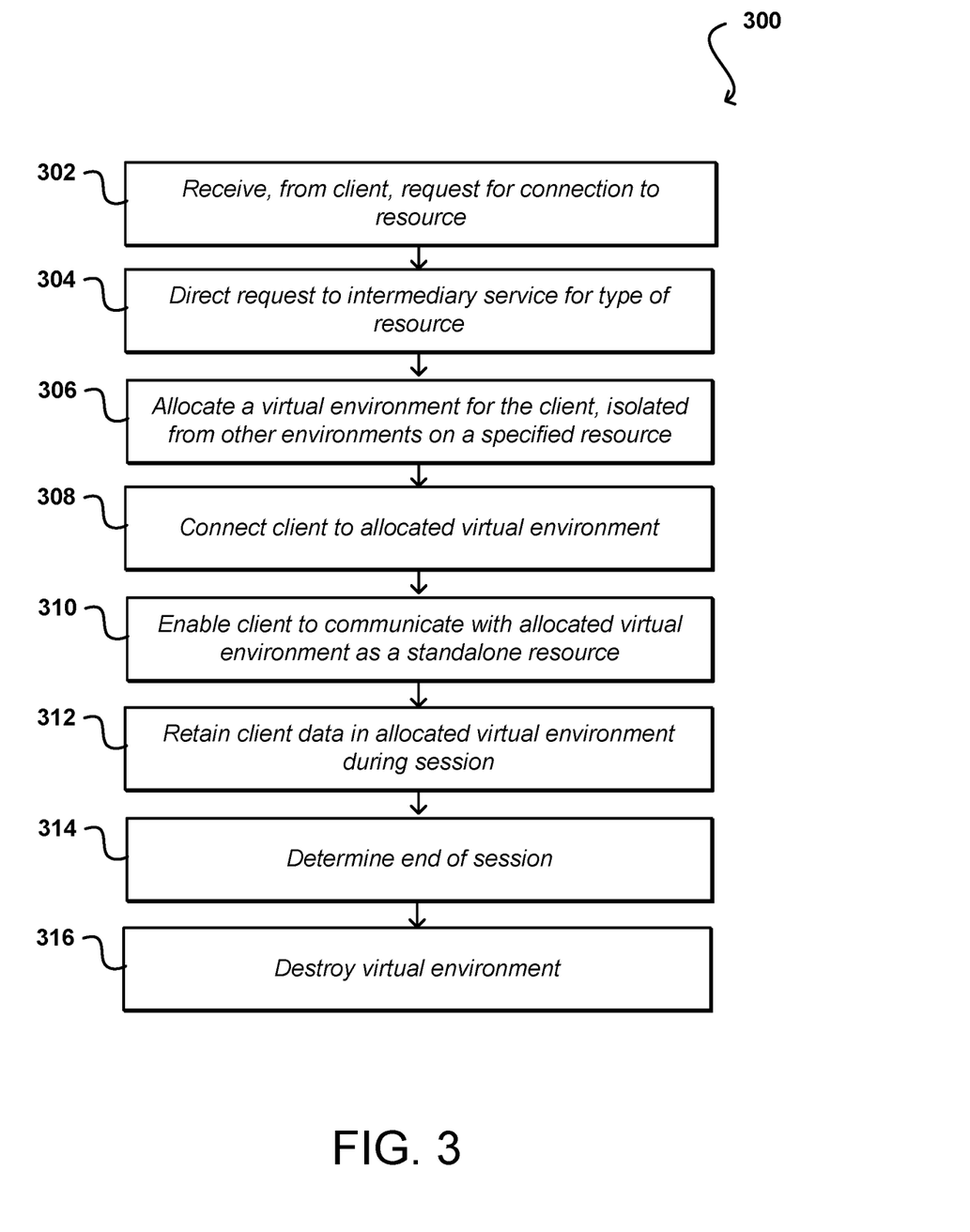
FIG. 3 illustrates an example process for connecting clients to virtual environments that can be utilized in accordance with various embodiments.

FIG. 3 illustrates an example process 300 for allocating a virtual environment for a client session that can be utilized in accordance with various embodiments. It should be understood that, for various processes discussed herein, there can be additional, fewer, or alternative steps performed in similar or alternative orders, or at least partially in parallel, in accordance with the various embodiments unless otherwise stated. In this example, a request is received 302 from a client device to connect to a resource of a specified type and/or able to perform a specified function. This can include, for example, a host machine running an application or service for processing the request. The request can be directed 304 to an intermediary service or other such system or component, although in some embodiments the service will receive or intercept the request, among other such options. This can be an intermediary service (or service interface) for a specific type of resource, or an intermediary service can handle multiple resource types as discussed and suggested elsewhere herein.

In response to the request, a virtual environment can be allocated 306 for the client, where that virtual environment is "isolated" from other environments on a specified resource. The virtual environment can be any appropriate environment, such as a virtual machine instance or a container, among other such options. The virtual environment can be considered to be "isolated" because the virtual environment can be configured such that an application or service executing in the environment functions as if the application or service had a dedicated host with no other tenants on the host, such as by using local memory as a virtual hard drive and performing other such actions discussed and suggested herein. The client device can be connected 308 to the allocated virtual environment. As mentioned, in at least some embodiments an intermediary service can maintain a pool of virtual environments, and connecting the client device to a virtual environment can include selecting an appropriate virtual environment from the pool. The client device, once connected, can be enabled 310 to communicate with the virtual environment as if the virtual environment is a standalone device. As mentioned, at least some of the functionality can be executed by the client device in some embodiments, and the client device can communicate "directly" with the environment as if communicating with a dedicated host device. The client data for the session can be retained 312 in the allocated virtual environment for the session, such as in resident memory as mentioned, without persisting the data to a drive on the host, for example, that might be accessible to other clients or customers. When it is determined 314 that the session has ended, or the client device no longer requires the virtual environment, the virtual environment can be destroyed 416. This can include destruction of any data that was stored for the virtual environment, such that the data is not available in the environment between sessions.

Figure 4:
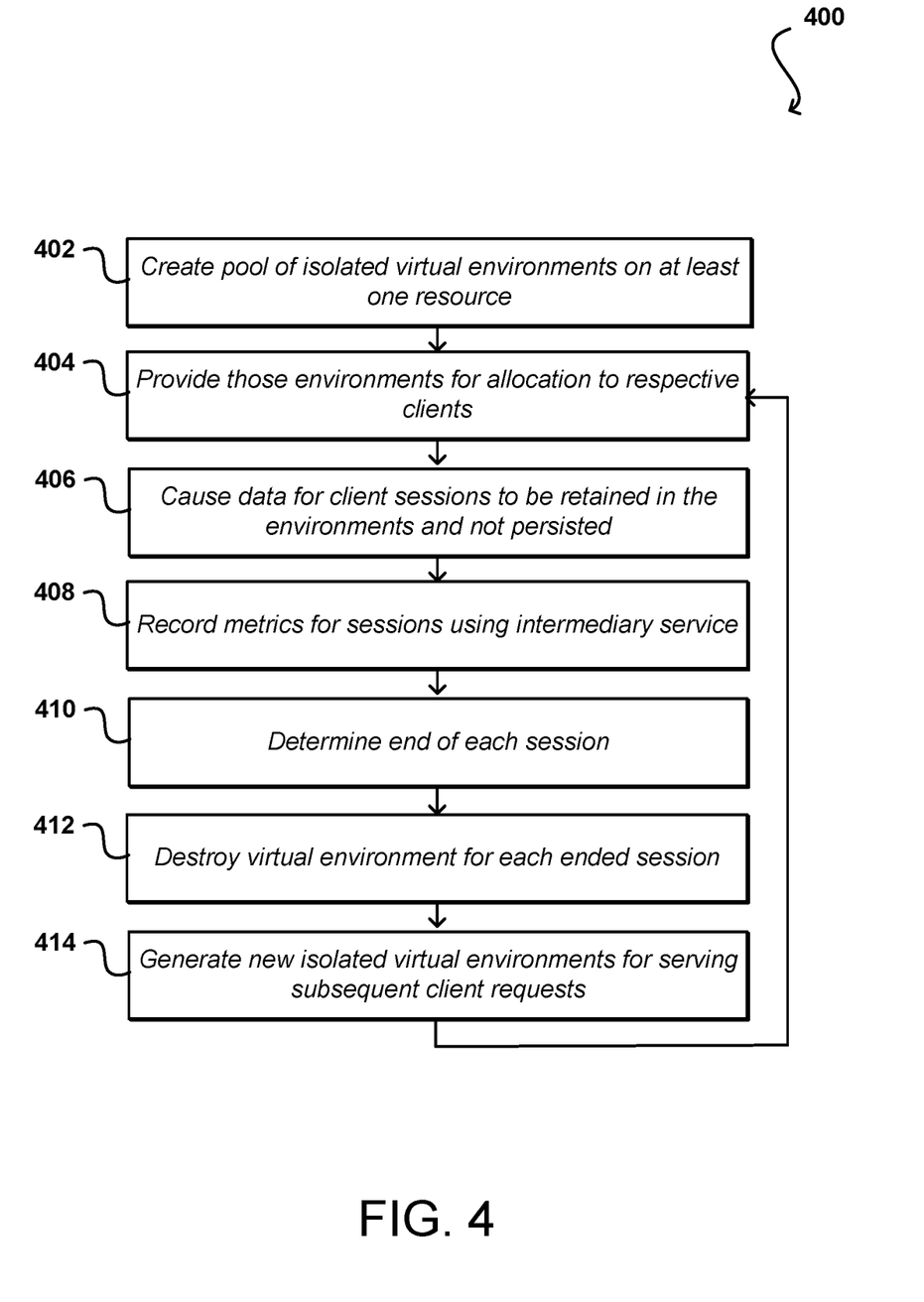
FIG. 4 illustrates an example process for managing a pool of isolated virtual environments that can be utilized in accordance with various embodiments.

FIG. 4 illustrates an example process 400 for managing a pool of virtual environments that can be utilized in accordance with various embodiments. In this example, a system or service, such as an intermediary service, can create 402 a pool (or other plurality) or virtual environments on at least one resource, such as a server or host machine. These environments can be considered to be "isolated" environments, as they can be configured to function as standalone resources or as if executing on dedicated hardware, among other such options. Those environments can then be provided 404 for allocation to respective clients. These can include, for example, client devices external to a resource provider environment including the intermediary service or a virtual client operating in the environment, among other such options. As mentioned, in some embodiments the intermediary service can be a third party service that manages connections to resources in a service environment for various customer devices. Data for the respective client sessions can be caused 406 to be retained in the environments, such as in local memory, and not persisted to locations that would be accessible to other clients. Various metrics can be captured and/or recorded 408 for the sessions using the intermediary service. These metrics can include metrics such as throughput, latency, and number of dropped connections, for example, as may be used to monitor the health of the pool of virtual environments, among other such purposes. For each virtual environment, the intermediary service can determine 410 the end of the respective session, either from an explicit notification or a terminated connection, among other such possibilities. In some embodiments, the third party service will send a message corresponding to the closing or termination of the processing, while in other embodiments the application will automatically close and exit, which can be detected by the intermediary service. The intermediary service can then destroy 412 the virtual environment after the respective session, including any customer data resident in the environment that was not otherwise written to secure storage or otherwise processed. New isolated virtual environments can then be generated 414 or otherwise allocated to maintain the pool of environments for serving subsequent client requests.

As mentioned, an application executing in a virtual environment can function as if it is executing on a dedicated host machine with no other virtual environments on the host, as well as no sharing of resources with other virtual environments. In the case of a browser renderer, a browser application executing on a client device can cause a request to be submitted to a resource provider environment to have a portion of the content rendered by an associated browser rendering application executing in the resource provider environment, which can have significantly more capacity for rendering than the client device. Accordingly, certain elements may be rendered on the client device while other elements are to be rendered by resources in the resource provider environment, with the result of that rendering (such as a set of images) being provided to the client device from the resources. Benefit can be obtained by causing resource-intensive rendering, such as a 2D view of 3D content rendered from a determined point of view, to be performed by a resource that can perform the rendering much more quickly, even taking latency into account. Having such rendering performed by remote resources can also occupy less memory and capacity on the client device, preventing the client device from being slowed by the processing. Rendering inside a virtual environment as discussed herein enables the application to perform the rendering as if the resources are not being shared with other environments, such that there can be no risk of having data inadvertently shared with other environments or having other data accessible from the current environment. Since a third party application or service may not be trusted by a provider to keep data secure, the virtual isolation prevents the application from determining that other data is even available on a host or resource.

When the browser application on the client device determines that a piece of content is to be rendered by a remote service, for example, the client device can send a request to an appropriate interface of the service. The request can include appropriate information, such as an identifier for the content, an identifier for the user or client device, and information for use in the rendering, among other such information. The request can be received to an intermediary service, for example, that is configured to listen for request of this type. The intermediary service can allocate one of the virtual environments from the pool for use in rendering the content, instead of directing the request to be processed by an instance on a resource using a conventional approach as discussed elsewhere herein. The content can be rendered using the application in the virtual environment, with the data for the rendering being maintained within that environment, such as in local RAM on the device. As mentioned, the data will not be accessible to any other customers having a virtual environment allocated on that machine. The content once rendered can be returned to the client device for display. After the rendering, or at an end of the browsing session, for example, the allocated virtual instance can be destroyed and the data deleted from local memory, such that the data is not available on the host machine after the virtual environment is deleted.

Figure 5:
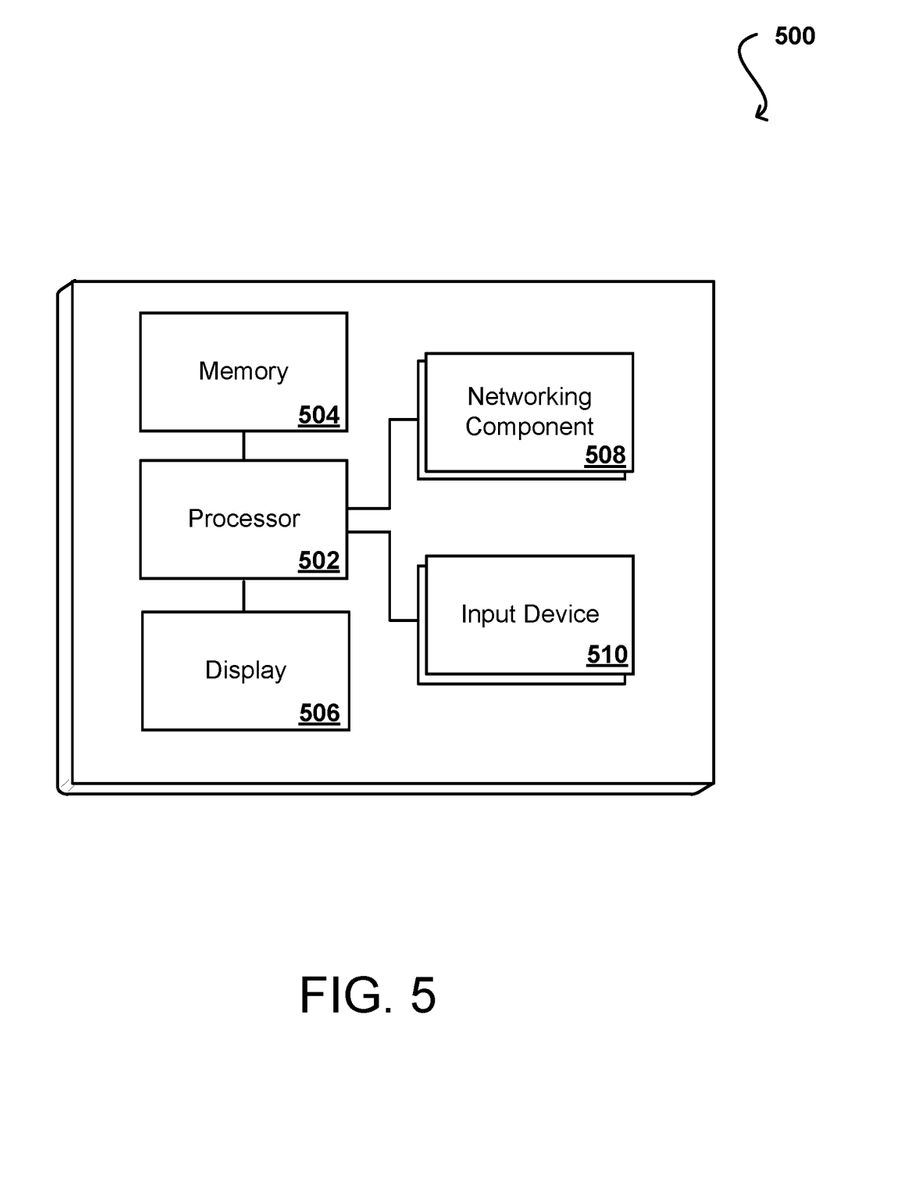
FIG. 5 illustrates a logical arrangement of a set of general components of an example computing device that can be utilized in accordance with various embodiments.

FIG. 5 illustrates a logical arrangement of a set of general components of an example computing device 500. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device may include some type of display element 506, such as a touch screen or liquid crystal display (LCD), although devices such as portable media players might convey information via other means, such as through audio speakers. The device can include one or more network interface components 508 configured to enable the device to transmit and receive information over a network. As discussed, the device in many embodiments will include at least one input element 510 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 500 of FIG. 5 can include one or more network interface elements 508 for communicating over various networks, such as a Wi-Fi, Bluetooth, RF, wired, or wireless communication systems. The device in many embodiments can communicate with a network, such as the Internet, and may be able to communicate with other such devices.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:
1. A computer-implemented method, comprising:
receiving a request from a client device to a multi-tenant environment, the request associated with an application;
determining an intermediary service in the multi-tenant environment;
allocating a first virtual machine using the intermediary service for executing a first instance of the application;
determining, by performance data collected by the intermediary service during processing in the first virtual machine, that a connection between the client device and the first virtual machine is lost;
connecting the intermediary service to the client device;
transferring the connection to a second instance of the application executing on a second virtual machine;
determining an end for the application; and
destroying the first virtual machine, the second virtual machine, and data associated with the first and the second instances of the application that is stored in one or more dedicated local memories of one or more host computers.

2. The computer-implemented method of claim 1, further comprising:
generating a pool of virtual machines on the one or more host computer in a multi-tenant environment, individual one of the pool of virtual machines including a virtualization container enabling the instance of the application to be isolated from other instances of the application executing on a respective one of the one or more host computers.

3. The computer-implemented method of claim 1, further comprising:
dedicating first storage for the data of the first instance of the application by allocating the first storage in a local memory of the one or more host computers; and
dedicating second storage for the data of the second instance of the application by allocating the second storage in the local memory of the one or more host computers.

4. The computer-implemented method of claim 1, wherein the data stored in the first storage is inaccessible to another client device having a third virtual machine on an individual host computer of the one or more host computers that includes the first storage.

5. The computer-implemented method of claim 1, further comprising:
generating new virtual machines to add to a pool of virtual machines as replacement to the first virtual machine and the second virtual machine.

6. The computer-implemented method of claim 1, wherein the application is associated with a third party service separate from a customer associated with the client device and separate from a provider of the multi-tenant environment.

7. The computer-implemented method of claim 1, wherein the application performs browser rendering.

8. A system, comprising:
at least one processor; and
memory including instruction that, when executed by the at least one processor, cause the system to:
receive a request from a client device to a multi-tenant environment, the request associated with an application;
determine an intermediary service in the multi-tenant environment;
allocate a first virtual machine using the intermediary service for executing a first instance of the application;
determine, by performance data collected by the intermediary service during processing in the first virtual machine, that a connection between the client device and the first virtual machine is lost;
connect the intermediary service to the client device;
transfer the connection to a second instance of the application executing on a second virtual machine;
determine an end for the application; and
destroy the first virtual machine, the second virtual machine, and data associated with the first and the second instances of the application that is stored in one or more dedicated local memories of one or more host computers.

9. The system of claim 8, wherein the memory including instruction that, when executed by the at least one processor, further cause the system to:
generate a pool of virtual machines on the one or more host computer in a multi-tenant environment, individual one of the pool of virtual machines including a virtualization container enabling the instance of the application to be isolated from other instances of the application executing on a respective one of the one or more host computers.

10. The system of claim 8, wherein the memory including instruction that, when executed by the at least one processor, further cause the system to:
dedicate first storage for the data of the first instance of the application by allocating the first storage in a local memory of the one or more host computers; and
dedicate second storage for the data of the second instance of the application by allocating the second storage in the local memory of the one or more host computers.

11. The system of claim 8, wherein the data stored in the first storage is inaccessible to another client device having a third virtual machine on an individual host computer of the one or more host computers that includes the first storage.

12. The system of claim 8, wherein the memory including instruction that, when executed by the at least one processor, further cause the system to:
generate new virtual machines to add to a pool of virtual machines as replacement to the first virtual machine and the second virtual machine.

13. The system of claim 8, wherein the application is associated with a third party service separate from a customer associated with the client device and separate from a provider of the multi-tenant environment.

14. The system of claim 8, wherein the application performs browser rendering.

15. The system of claim 8, wherein the memory including instruction that, when executed by the at least one processor, further cause the system to:
maintain two or more types of virtual machines in a pool of virtual machines from which the first virtual machine and the second virtual machine are selected, individual type of the types of the virtual machines executing a version or a configuration of code for the application, wherein the first virtual machine and the second virtual machine are selected based at least in part upon a requested version or a requested configuration comprised in the request.

16. The system of claim 8, wherein the memory including instruction that, when executed by the at least one processor, further cause the system to:
determine, by the intermediary service, that the request is incomplete; and
generate, by the intermediary service, a complete version of the request before forwarding the request to the first virtual machine.

17. The system of claim 8, wherein the memory including instruction that, when executed by the at least one processor, further cause the system to:
store, by the intermediary service, information for a customer associated with the client device; and
insert a portion of the information for the customer in a response to be sent to the client device on behalf of the first virtual machine, wherein the first virtual machine does not have access to the information.

18. A non-transitory computer-readable storage medium including instructions that, when executed by at least one processor, cause the at least one processor to:
- receive a request from a client device to a multi-tenant environment, the request associated with an application;
- determine an intermediary service in the multi-tenant environment;
- allocate a first virtual machine using the intermediary service for executing a first instance of the application;
- determine, by performance data collected by the intermediary service during processing in the first virtual machine, that a connection between the client device and the first virtual machine is lost;
- connect the intermediary service to the client device;
- transfer the connection to a second instance of the application executing on a second virtual machine;
- determine an end for the application; and
- destroy the first virtual machine, the second virtual machine, and data associated with the first and the second instances of the application that is stored in one or more dedicated local memories of one or more host computers.

19. The non-transitory computer-readable storage medium of claim 18 including instructions that, when executed by at least one processor, further cause the at least one processor to:
- generate a pool of virtual machines on the one or more host computer in a multi-tenant environment, individual one of the pool of virtual machines including a virtualization container enabling the instance of the application to be isolated from other instances of the application executing on a respective one of the one or more host computers.

20. The non-transitory computer-readable storage medium of claim 18 including instructions that, when executed by at least one processor, further cause the at least one processor to:
- dedicate first storage for the data of the first instance of the application by allocating the first storage in a local memory of the one or more host computers; and
- dedicate second storage for the data of the second instance of the application by allocating the second storage in the local memory of the one or more host computers.

* * * * *